United States Patent
Vasallo et al.

(10) Patent No.: US 9,109,544 B2
(45) Date of Patent: Aug. 18, 2015

(54) DEVICE AND METHOD FOR COMPRESSOR AND CHARGE AIR COOLER PROTECTION IN AN INTERNAL COMBUSTION ENGINE

(75) Inventors: Alberto Vasallo, Turin (IT); Federico Ferrero, Caselette (IT); Federico Luigi Guglielmone, Rivoli (IT); Cristian Taibi, Turin (IT)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 561 days.

(21) Appl. No.: 12/945,609

(22) Filed: Nov. 12, 2010

(65) Prior Publication Data
US 2011/0114066 A1    May 19, 2011

(30) Foreign Application Priority Data
Nov. 12, 2009  (GB) .................................. 0919782.3

(51) Int. Cl.
| | |
|---|---|
| F02B 33/44 | (2006.01) |
| F02B 33/00 | (2006.01) |
| F02B 47/08 | (2006.01) |
| F02M 25/07 | (2006.01) |
| F02B 29/04 | (2006.01) |

(Continued)

(52) U.S. Cl.
CPC ........ *F02M 25/0707* (2013.01); *F02B 29/0406* (2013.01); *F02D 41/0007* (2013.01); *F02D 41/0065* (2013.01); *F02D 41/10* (2013.01); *F02M 25/0709* (2013.01); *F02M 25/0732* (2013.01); *F02M 25/0744* (2013.01); *F02B 3/06* (2013.01); *F02D 2200/0414* (2013.01); *F02M 25/0718* (2013.01); *F02M 25/0754* (2013.01); *Y02T 10/144* (2013.01); *Y02T 10/146* (2013.01); *Y02T 10/47* (2013.01)

(58) Field of Classification Search
USPC .......................... 60/605.2; 123/568.12, 568.2
See application file for complete search history.

(56) References Cited

U.S. PATENT DOCUMENTS

| | | | | |
|---|---|---|---|---|
| 5,740,786 A | * | 4/1998 | Gartner .................... | 123/568.12 |
| 6,701,710 B1 | * | 3/2004 | Ahrens et al. ................ | 60/605.2 |

(Continued)

FOREIGN PATENT DOCUMENTS

JP    2006207467 A    8/2006

OTHER PUBLICATIONS

British Search Report dated Mar. 1, 2010, issued in Application No. 0919782.3.

*Primary Examiner* — Kenneth Bomberg
*Assistant Examiner* — Paolo Isada
(74) *Attorney, Agent, or Firm* — Ingrassia Fisher & Lorenz PC

(57) ABSTRACT

A device is provided for compressor and charge air cooler protection in an internal combustion engine, such as a Diesel engine. The engine having an intake manifold and an exhaust manifold, first and second EGR routes, a charge air cooler, a turbocharger having a compressor and a turbine. A regulator is also provided for regulating the flow rate of exhaust gas and the splitting of exhaust gas between the first and second EGR route. A temperature sensor is also provided for sensing output temperature of gas at the outlet of said compressor. A method and computer readable medium embodying a computer program product are also provided that have a first phase of monitoring a parameter representative of the gas temperature at the output of the compressor and a second phase in which an activity involving engine components operation is performed. The activity is performed using temperature information determined in the monitoring phase.

15 Claims, 2 Drawing Sheets

(51) Int. Cl.
*F02D 41/00* (2006.01)
*F02D 41/10* (2006.01)
*F02B 3/06* (2006.01)

(56) References Cited

U.S. PATENT DOCUMENTS

| | | | |
|---|---|---|---|
| 7,117,078 B1* | 10/2006 | Gangopadhyay | 701/103 |
| 7,380,400 B2* | 6/2008 | Barbe et al. | 60/605.2 |
| 7,493,762 B2* | 2/2009 | Barbe et al. | 60/605.2 |
| 8,122,717 B2* | 2/2012 | Joergl et al. | 60/605.1 |
| 2006/0086089 A1 | 4/2006 | Ge | |
| 2007/0068500 A1* | 3/2007 | Joergl et al. | 123/568.24 |
| 2007/0125081 A1* | 6/2007 | Czarnowski et al. | 60/599 |
| 2007/0144501 A1* | 6/2007 | Joergl et al. | 123/568.12 |
| 2009/0132153 A1* | 5/2009 | Shutty et al. | 701/108 |
| 2009/0183509 A1* | 7/2009 | Joergl | 60/605.2 |
| 2009/0223219 A1* | 9/2009 | Joergl et al. | 60/602 |
| 2009/0271094 A1* | 10/2009 | Stablein et al. | 701/108 |
| 2009/0277431 A1* | 11/2009 | Nitzke et al. | 123/568.12 |
| 2010/0043428 A1* | 2/2010 | Stablein et al. | 60/602 |
| 2010/0107631 A1* | 5/2010 | Pearson | 60/605.2 |
| 2010/0269802 A1* | 10/2010 | Nakashima et al. | 123/568.21 |
| 2011/0088674 A1* | 4/2011 | Shutty et al. | 123/568.21 |
| 2011/0224948 A1* | 9/2011 | Cianflone et al. | 702/183 |

\* cited by examiner

210 Measuring a gas temperature at an outlet of said compressor with a temperature sensor

220 Determining if the gas temperature at the compressor output is greater than a predetermined threshold

230 Reducing the gas temperature at the output of said compressor when the gas temperature is greater than the predetermined threshold by regulating, via the valve, the splitting of flow rates of the exhaust gas through the first EGR rout and the second EGR rout and maintaining the regulated flow rate of the exhaust gas through the first EGR rout and the second EGR rout for a predetermined time

240 Deactivating the reducing the gas temperature at the output of said compressor when the gas temperature is less than the predetermined threshold and the predetermined time has elapsed

250 Measuring an ambient temperature and a manifold temperature in order to monitor charge air cooler efficiency on a basis of a relationship as follows under a condition that said first EGR route is substantially closed

DEVICE AND METHOD FOR COMPRESSOR AND CHARGE AIR COOLER PROTECTION IN AN INTERNAL COMBUSTION ENGINE

CROSS-REFERENCE TO RELATED APPLICATION

This application claims priority to British Patent Application No. 0919782.3, filed Nov. 12, 2009, which is incorporated herein by reference in its entirety.

TECHNICAL FIELD

The technical field relates to a device and a method for compressor and Charge Air Cooler (CAC) protection in an internal combustion engine, in particular in a Diesel engine having a low pressure EGR system.

BACKGROUND

A turbocharged Diesel engine system generally comprises a Diesel engine having an intake manifold and an exhaust manifold, an intake line for conveying fresh air from the environment in the intake manifold, an exhaust line for conveying the exhaust gas from the exhaust manifold to the environment, and a turbocharger which comprises a compressor located in the intake line for compressing the air stream flowing therein, and a turbine located in the exhaust line for driving said compressor.

The turbocharged Diesel engine system further comprises an intercooler, also indicated as Charge Air Cooler (CAC), which is located in the intake line downstream the compressor, for cooling the air stream before it reaches the intake manifold. The turbocharged Diesel engine systems can also be equipped with a diesel oxidation catalyst (DOC) for degrading residual hydrocarbons and carbon oxides contained in the exhaust gas and, downstream of the DOC, a diesel particulate filter (DPF) for capturing and removing diesel particulate matter (soot) from the exhaust gas.

In order to reduce the polluting emission, most turbocharged Diesel engine system actually comprises a first exhaust gas recirculation (EGR) system, for selectively routing back exhaust gas from the exhaust manifold into the intake manifold. In such a way the exhaust gas mixed with the fresh induction air is aspired into the engine cylinders, in order to reduce the production of unburned hydrocarbon (HC), carbon monoxide (CO), soot, and oxides of nitrogen ($NO_x$) during the combustion process. In order to further reduce the $NO_x$ emission, improved EGR systems comprise an additional EGR conduit, which fluidly connects the exhaust line downstream the DPF with the intake line upstream the compressor of turbocharger, an additional EGR cooler located in the additional EGR conduit, and additional valve means for regulating the flow rate of exhaust gas through the additional EGR conduit.

In these improved systems, while the conventional EGR conduit defines a short route for the exhaust gas recirculation, the additional EGR conduit defines a long route for the exhaust gas recirculation, which comprises also a relevant portion of the exhaust line and a relevant portion of the intake line. Flowing along the long route, the exhaust gas is then obliged to pass through the turbine of turbocharger, the DOC, the DPF, the additional EGR cooler, the compressor of turbocharger and the charge air cooler, so that it become considerably colder than the exhaust gas which flows through the short route, reaching thereby the intake manifold at a lower temperature.

These improved EGR systems are generally configured for routing back the exhaust gas partially through the short route and partially through the long route, in order to maintain the temperature of the induction air in the intake manifold at an optimal intermediate value in any engine operating condition.

In the known art the total amount of exhaust gas and the long route exhaust gas rate are determined by the Electronic Control Unit (ECU) using empirically determined data sets or maps, which respectively correlate the total amount of exhaust gas and the long route exhaust gas rate to a plurality of engine operating parameters, such as for example engine speed, engine load and engine coolant temperature. One drawback of these improved EGR systems is that such data sets or maps are determined during a calibration activity, using an engine system perfectly efficient which is operated under standard environmental conditions, i.e., standard environmental temperature, pressure and moisture. Therefore, the value contained in the data sets or maps are valid only for engine systems that are operated in the same environmental conditions of that used in calibration phase, and completely ignore the reduction in efficiency of the engine system components due to several conditions that may occur during use of the vehicle.

For example, it has been observed that in some real use conditions of the vehicle, such as for example high-altitude and/or high-temperature operation and repeated accelerations a series of problems may occur. For example various components may drift from their expected operation parameters leading to sub-optimal control of the engine by the ECU or even components damage. Furthermore, long-route EGR cooler fouling may occur and temperatures out of specifications may be reached downstream of compressor and in the engine intake manifold. It is clear that these problems would lead to components damage due to thermal stress and/or excessive oil cracking and deposition, or at least to a reduced life of engine components with an associated increase of costs.

Due to this situation, the known art has tried to solve the above problems by ensuring protection against excessive temperatures downstream of compressor as well as overspeed are performed in open-loop, with the help of undesirable significant engineering margins. In case of the presence of a long-route EGR system this disadvantage increases, since at mid-load, in the EUDC area, compressor protection is enacted in open loop too, severely limiting the system performance. It appears therefore that these solutions are unsatisfactory and may even be considered palliative.

At least one object is to create a device and a method that allows protecting the compressor and downstream pipes from thermal stress, from oil cracking, and allowing operating the compressor with reduced engineering margin with respect to the current situation. At least another object is to provide such protection strategy taking advantage from the computational capabilities of the Electronic Control Unit (ECU) of the vehicle. At least a further object is to meet these goals by means of a simple, rational and inexpensive solution. In addition, other objects, desirable features and characteristics will become apparent from the subsequent summary and detailed description, and the appended claims, taken in conjunction with the accompanying drawings and this background.

SUMMARY

A device is provided for compressor and charge air cooler protection in an internal combustion engine, in particular in a Diesel engine, the engine having an intake manifold and an exhaust manifold and corresponding intake and exhaust lines, first and second EGR routes, a charge air cooler located in the intake line upstream the intake manifold and downstream the second EGR route, a turbocharger having a compressor located in the intake line, the system having regulating means for regulating the flow rate of exhaust gas and the splitting of exhaust gas between the first and second EGR route. A temperature sensor means is also provided for measuring the temperature of gas at the outlet of the compressor.

A method is provided for compressor and charge air cooler protection in an internal combustion engine, in particular in a Diesel engine, the engine having an intake manifold and an exhaust manifold and corresponding intake and exhaust lines, first and second EGR routes, a charge air cooler located in the intake line upstream the intake manifold and downstream the second EGR route, a turbocharger having a compressor located in the intake line and a turbine in the exhaust line, the system having regulating means for regulating the flow rate of exhaust gas and the splitting of exhaust gas between the first and second EGR route. The method also comprises at least a phase of monitoring a parameter representative of the gas temperature at the output of the compressor and at least a second phase in which an activity involving engine components operation is performed, the activity being performed using also the temperature value determined in said monitoring phase.

In a first embodiment of the method, such activity is directed to reduce gas temperature at the output of the compressor and is performed in case the temperature determined in the temperature monitoring phase is above a predetermined threshold. This activity may comprise a phase of regulating the splitting of flow rate of exhaust gas through the second EGR route with respect to the flow rate of exhaust gas through the first EGR route for a predetermined amount of time if the actual temperature of the gas at the compressor outlet is above the threshold temperature. According to a further embodiment of the invention, an activity comprising a phase of regulating the geometry of the turbine housing for a predetermined amount of time may be performed, if the actual temperature of the gas at the compressor outlet is above the threshold temperature. Activities permitted by the device and method of the invention may also comprise allowing overboost during acceleration in order to optimize engine performance during transients or the monitoring of charge air cooler efficiency during use of the vehicle.

The method can be realized in the form of a computer program comprising a program-code to carry out all the steps of the method of the invention and in the form of a computer program product comprising means for executing the computer program. The computer program product comprises, according to a preferred embodiment of the invention, a control apparatus for an IC engine, for example the ECU of the engine, in which the program is stored so that the control apparatus defines an embodiment of the invention in the same way as the method. In this case, when the control apparatus execute the computer program all the steps of the method are carried out.

The method can be also realized in the form of an electromagnetic signal, the signal being modulated to carry a sequence of data bits which represent a computer program to carry out all steps of the method.

The invention further provides an internal combustion engine specially arranged for carrying out the method.

BRIEF DESCRIPTION OF THE DRAWINGS

The present invention will hereinafter be described in conjunction with the following drawing FIGURE, and:

FIG. 2 is a flowchart illustrating a method for protection in an internal combustion engine, in accordance with an embodiment.

DETAILED DESCRIPTION

Figure 1:
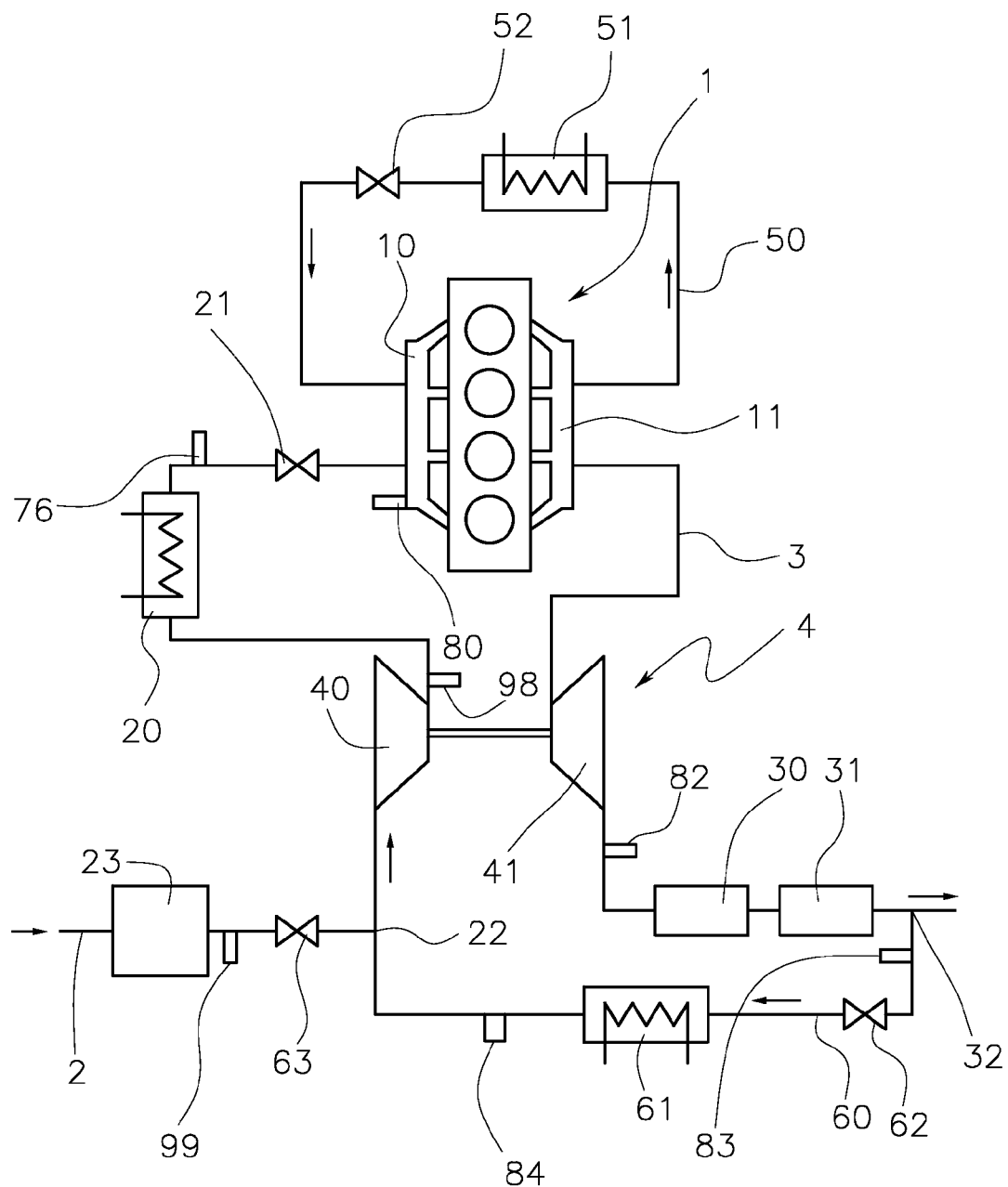
FIG. 1 is a schematic illustration of a turbocharged Diesel engine system with an embodiment of the device allowing the method according to an embodiment of the invention.

The following detailed description is merely exemplary in nature and is not intended to limit application and uses. Furthermore, there is no intention to be bound by any theory presented in the preceding background or summary or the following detailed description.

The embodiments hereinafter are disclosed with reference to a turbocharged Diesel engine system. However, the embodiments are applicable to different Diesel engine system and even to spark-ignition engine systems.

The turbocharged Diesel engine system comprises a Diesel engine 1 having an intake manifold 10 and an exhaust manifold 11, an intake line 2 for conveying fresh air from the environment in the intake manifold 10, an exhaust line 3 for conveying the exhaust gas from the exhaust manifold 11 to the environment, and a turbocharger 4 which comprises a compressor 40 located in the intake line 2 for compressing the air stream flowing therein, and a turbine 41, preferably Variable Nozzle Turbine (VNT), located in the exhaust line 3 for driving said compressor 40. A temperature sensor 80 is provided for determining the temperature within the intake manifold 10.

The turbocharged Diesel engine system further comprises an intercooler (or charge air cooler) 20 located in the intake line 2 downstream the compressor 40 of turbocharger 4, for cooling the air stream before it reaches the intake manifold 10, and a valve 21 located in the intake line between the charge air cooler 20 and the intake manifold 10. The turbocharged Diesel engine system further comprises a diesel oxidation catalyst (DOC) 30 located in the exhaust line 3 downstream the turbine 41 of turbocharger 4, for degrading residual hydrocarbons and carbon oxides contained in the exhaust gas, and a diesel particulate filter (DPF) 31 located in the exhaust line 3 downstream the DOC 30, for capturing and removing diesel particulate matter (soot) from the exhaust gas.

In order to reduce the polluting emission, the turbocharged Diesel engine system comprises an exhaust gas recirculation (EGR) system, for selectively routing back exhaust gas from the exhaust manifold into the intake manifold. The EGR system comprise a first EGR conduit 50 for directly fluidly connecting the exhaust manifold 11 with the intake manifold 12, a first EGR cooler 51 for cooling the exhaust gas, and a first electrically controlled valve 52 for determining the flow rate of exhaust gas through the first EGR conduit 51. The first EGR conduit 51 defines a short route for the exhaust gas recirculation cooler, so that the exhaust gas routed back by the first EGR conduit 51 is quite hot.

The EGR system further comprise a second EGR conduit 60, which fluidly connects a branching point 32 of the exhaust line 3 downstream the DPF 32 with a leading point 22 of the intake line 2 upstream the compressor 40 of turbocharger 4, and a second EGR cooler 61 located in the additional EGR conduit 60. The flow rate of exhaust gas through the second EGR conduit 60 is determined by an electrically controlled valve 62, wherein the valve 62 is located in the second EGR conduit 60 upstream the second EGR cooler 61. A valve 63 is located in the intake line 2 downstream an air filter 23 and upstream the leading point 22. The second EGR conduit 60 defines a long route for the exhaust gas recirculation, which comprises also the portion of the exhaust line 3 comprised between the exhaust manifold 11 and the branching point 32, and the portion of the intake line 2 comprised between the leading point 22 to the intake manifold 10.

Flowing along the long route, the exhaust gas is obliged to pass through the turbine 41 of turbocharger 4, the DOP 30, the DPF 31, the second EGR cooler 61, the compressor 40 of turbocharger 4 and the charge air cooler 20, so that it become considerably colder than the exhaust gas which flows through the first EGR conduit 50, to thereby reaching the intake manifold at a lower temperature.

The turbocharged Diesel engine system is operated by a microprocessor (ECU) based control circuit, which is provided for generating and applying control signals to the valves 52, 62 and 63, to thereby adjusting the flow rate of exhaust gas through the first EGR conduit 50 and the second EGR conduit 60. A pressure sensor 82 and a temperature sensor 83 are provided respectively upstream and downstream of the DOP 30 and DPF 31 group. Furthermore, a temperature sensor 84 is provided downstream of the second EGR cooler 61 in order to measure the temperature downstream of the long route EGR; temperature downstream the charge air cooler may be measured by a dedicated sensor 76. A temperature sensor 99 is also present in order to measure ambient temperature and temperature sensor 80 is provided in order to measure manifold temperature.

A further temperature sensor 98 is placed immediately downstream of the compressor 40 in order to measure gas temperature at the compressor outlet, such temperature sensor 98 being upstream with respect to the charge air cooler 20. Accordingly, it is therefore possible to monitor intermittently or continuously a parameter representative of the gas temperature at the output of the compressor 40 and, depending to the value of the temperature measured, it is possible to perform through electronic control of the various parameters of the engine system a wide number of activities. In general, such activities involve operations performed on engine components using the temperature value determined in the temperature monitoring phase.

Specifically, some activities performed can be directed to reduce gas temperature at the compressor outlet in case the temperature determined in the first phase is above a predetermined threshold. This procedure amounts to a first effective components protection strategy. Moreover, when gas temperature at the output of said compressor is below said predetermined threshold said activity directed to reduce said temperature is deactivated.

In order to avoid jerking and undesirable controller oscillation a time threshold is preferably set, in order to activate or deactivate the control system after a predetermined amount of time has elapsed from the attainment of the temperature threshold condition. The activity directed to reduce said temperature may comprise a phase of regulating the splitting of flow rate of exhaust gas through said second EGR route with respect to the flow rate of exhaust gas through said first EGR route for a predetermined amount of time if the actual temperature of the compressor is superior to a said temperature threshold. Specifically, the electrically controlled valve 62 located in the second EGR conduit 60 may be actuated and regulated in order to adjust flow rate of exhaust gas through the second EGR conduit 60, realizing a splitting of the flow rate between the first and second EGR conduits that decreasing the flow in the second EGR conduit 60 and eventually increasing correspondingly the flow in the first EGR conduit; this allows a progressive decrease of gas temperature at the outlet of the compressor.

A further method to decrease gas temperature at the outlet of the compressor involves intervening directly on the compressor outlet pressure. In other words, an activity directed to reduce said temperature may comprise a phase of regulating the geometry of the turbine 41 housing for a predetermined amount of time in order to reduce outlet compressor pressure, if the actual temperature of the gas at the outlet of compressor is superior to the threshold temperature. Specifically this may be obtained by employing the capabilities of the Variable Nozzle Turbine (VNT), adjusting the movable vane angles to optimize turbine behaviour in relation to desired effect.

The activities connected to splitting EGR flow by means of valve 62 regulation and to regulation of turbine housing geometry may also be performed in parallel, for better results. The activities that the presence of the temperature sensor 98 renders possible, may also comprise charge air cooler (CAC) efficiency monitoring. Such activities being able to detect early a faulty condition, also contributing to components protection. In fact, the presence of temperature sensor 98 placed immediately downstream of the compressor 40 allows, in cooperation with temperature sensor 99 ($T_{ambient}$) and temperature sensor 80 ($T_{manifold}$), to monitor CAC efficiency based on the following relationship:

$$CAC_{efficiency} = \frac{Tcom, out - Tmanifold}{Tcom, out - Tambient}$$

This monitoring is possible when no short-route EGR is used and both $T_{ambient}$ and $T_{manifold}$ are measured as explained above.

The CAC efficiency evaluation can be used for detection of internal and external CAC fouling due to soot leakage or dirt, respectively or for detection of conditions prone to moisture condensation. Furthermore such monitoring gives the capability to optimize and extend CAC by-pass operation depending on the operating limits.

A further activity that the inventive compressor temperature control allows is the overboost which is made possible during acceleration thanks to system thermal capacity. Also, with the inventive compressor temperature control, limit temperature may be reached in a shorter time with respect to prior art solutions.

The embodiments of the invention have several important advantages. A first notable benefit is that it allows optimizing Long Route/Short Route EGR split and boosting level according to the European Extra-Urban Drive Cycle (EUDC). Furthermore, the embodiments of the invention allow protecting the compressor against thermal stress and oil cracking. Another important benefit is that the embodiments of the invention allow reducing the engineering margins with benefits during heavy accelerations and high altitude operation as well as component ageing. Furthermore, the embodiments of the invention allow optimizing performance during transients thanks to the closed-loop temperature control being performed. Finally the invention allows monitoring CAC efficiency during use of the vehicle and preventing operation in critical ambient conditions.

FIG. 2 is a flowchart illustrating a method 200 for protection in an internal combustion engine, in accordance with an embodiment. The method 200 may include, but is not limited to measuring a gas temperature at an outlet of said compressor with a temperature sensor (Step 210); determining if the gas temperature at the compressor output is greater than a predetermined threshold (Step 220); reducing the gas temperature at the output of said compressor when the gas temperature is greater than the predetermined threshold by regulating, via the valve, the splitting of flow rates of the exhaust gas through the first EGR rout and the second EGR rout and maintaining the regulated flow rate of the exhaust gas through the first EGR rout and the second EGR rout for a predetermined time (Step 230); deactivating the reducing the gas temperature at the output of said compressor when the gas temperature is less than the predetermined threshold and the predetermined time has elapsed (Step 240); and Measuring an ambient temperature and a manifold temperature in order to monitor charge air cooler efficiency on a basis of a relationship as follows under a condition that said first EGR route is substantially closed (Step 250).

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An internal combustion engine with air cooler protection, comprising:
    an intake manifold;
    an intake line corresponding to the intake manifold;
    an exhaust manifold;
    an exhaust line corresponding to the exhaust manifold;
    a first EGR route;
    a second EGR route;
    a charge air cooler located in the intake line upstream from the intake manifold and downstream the second EGR route;
    a turbocharger;
    a compressor of the turbocharger located in the intake line;
    a turbine in the exhaust line;
    a valve adapted to regulate a flow rate of an exhaust gas and a splitting of the exhaust gas between said first EGR route and said second EGR route;
    a temperature sensor adapted to measure a gas temperature at an outlet of said compressor; and
    a processor configured to:
        determine if the gas temperature at the compressor output is greater than a predetermined threshold,
        reduce the gas temperature at the output of said compressor when the gas temperature is greater than the predetermined threshold by regulating, via the valve, the splitting of flow rates of the exhaust gas through the first EGR rout and the second EGR rout and maintaining the regulated flow rate of the exhaust gas through the first EGR rout and the second EGR rout for a predetermined time;
        deactivate the reducing of the gas temperature at the output of said compressor if the gas temperature is less than the predetermined threshold and the predetermined time has elapsed;
        receive an ambient temperature and a manifold temperature; and
        monitor a charge air cooler efficiency on a basis of a relationship as follows under a condition that said first EGR route is substantially closed:

$$CAC_{efficiency} = \frac{Tcom, \text{out} - Tmanifold}{Tcom, \text{out} - Tambient},$$

where Tcom, out is the gas temperature at the output of said compressor, Tmanifold is the manifold temperature and Tambient is the ambient temperature.

2. The internal combustion engine as in claim 1, wherein the internal combustion engine is a Diesel engine.

3. The internal combustion engine as in claim 1, said processor further adapted to regulate the splitting of the flow rate of the exhaust gas through said second EGR route with respect to the flow rate of the exhaust gas through said first EGR route for a predetermined amount of time if an actual temperature at the outlet of the compressor outlet is above said predetermined threshold.

4. The internal combustion engine as in claim 1, said processor further adapted to regulate a geometry of a turbine housing for a predetermined amount of time if an actual temperature at the outlet of the compressor is above a predetermined temperature.

5. The internal combustion engine as in claim 1, said processor further adapted to allow an overboost during an acceleration.

6. A method for protection in an internal combustion engine, said internal combustion engine comprising:
    an intake manifold;
    an intake line corresponding to the intake manifold;
    an exhaust manifold;
    an exhaust line corresponding to the exhaust manifold;
    a first EGR route;
    a second EGR route;
    a charge air cooler located in the intake line upstream from the intake manifold and downstream the second EGR route;
    a turbocharger;
    a compressor of the turbocharger located in the intake line;
    a turbine in the exhaust line; and
    a valve adapted to regulate a flow rate of an exhaust gas and a splitting of the exhaust gas between said first EGR route and said second EGR route,
    said method comprising the steps of:
        measuring a gas temperature at an outlet of said compressor with a temperature sensor; and
        performing an activity involving an operation of the internal combustion engine using the gas temperature, wherein said performing the activity comprises the steps of:
        determining if the gas temperature at the compressor output is greater than a predetermined threshold; and
        reducing the gas temperature at the output of said compressor when the gas temperature is greater than the predetermined threshold by regulating, via the valve, the splitting of flow rates of the exhaust gas through the first EGR rout and the second EGR rout and maintaining the regulated flow rate of the exhaust gas through the first EGR rout and the second EGR rout for a predetermined time; and
        deactivating the reducing the gas temperature at the output of said compressor when the gas temperature is less than the predetermined threshold and the predetermined time has elapsed
    wherein said performing the activity comprises measuring an ambient temperature and a manifold temperature in order to monitor charge air cooler efficiency on a basis of a relationship as follows under a condition that said first EGR route is substantially closed:

$$CAC_{efficiency} = \frac{Tcom, \text{out} - Tmanifold}{Tcom, \text{out} - Tambient},$$

where Tcom, out is the gas temperature at the output of said compressor, Tmanifold is the manifold temperature and Tambient is the ambient temperature.

7. The method as in claim 6, wherein the reducing the gas temperature comprises regulating the splitting of the flow rate of the exhaust gas through said second EGR route with respect to the flow rate of the exhaust gas through said first EGR route for a predetermined amount of time if an actual temperature at the outlet of the compressor outlet is above said predetermined threshold.

8. The method as in claim 6, the reducing said gas temperature comprises regulating a geometry of a turbine housing for a predetermined amount of time if an actual temperature at the outlet of the compressor is above a predetermined temperature.

9. The method as in claim 6, wherein said performing the activity comprises allowing an overboost during an acceleration.

10. A non-transitory computer readable medium embodying a computer program product, said computer program product comprising:
a program for protection in an internal combustion engine, said internal combustion engine comprising:
an intake manifold;
an intake line corresponding to the intake manifold;
an exhaust manifold;
an exhaust line corresponding to the exhaust manifold;
a first EGR route;
a second EGR route;
a charge air cooler located in the intake line upstream from the intake manifold and downstream the second EGR route;
a turbocharger;
a compressor of the turbocharger located in the intake line;
a turbine in the exhaust line; and
a valve adapted to regulate a flow rate of an exhaust gas and a splitting of the exhaust gas between said first EGR route and said second EGR route,
said program configured to:
measure a gas temperature at an outlet of said compressor with a temperature sensor;
reduce the gas temperature at the output of said compressor when the gas temperature is greater than the predetermined threshold by regulating, via the valve, the splitting of flow rates of the exhaust gas through the first EGR rout and the second EGR rout and maintaining the regulated flow rate of the exhaust gas through the first EGR rout and the second EGR rout for a predetermined time;
deactivate the reducing the gas temperature at the output of said compressor when the gas temperature is less than the predetermined threshold and the predetermined time has elapsed;
determining if the gas temperature is greater than a predetermined threshold;
reducing the gas temperature at the output of said compressor if the gas temperature is greater than the predetermined threshold; and
measure an ambient temperature and a manifold temperature in order to monitor charge air cooler efficiency on a basis of a relationship as follows under a condition that said first EGR route is substantially closed:

$$CAC_{efficiency} = \frac{Tcom, \text{out} - Tmanifold}{Tcom, \text{out} - Tambient},$$

where Tcom, out is the gas temperature at the output of said compressor, Tmanifold is the manifold temperature and Tambient is the ambient temperature.

11. The non-transitory computer readable medium embodying the computer program product as in claim 10, wherein said program is further configured to deactivate the reducing the gas temperature at the output of said compressor if the gas temperature is less than the predetermined threshold.

12. The non-transitory computer readable medium embodying the computer program product as in claim 11, wherein said program is further configured to reduce the gas temperature and deactivate the reducing the gas temperature after a predetermined amount of time has elapsed from an attainment of a relative threshold condition.

13. The non-transitory computer readable medium embodying the computer program product as in claim 11, wherein said program is further configured to regulate the splitting of the flow rate of the exhaust gas through said second EGR route with respect to the flow rate of the exhaust gas through said first EGR route for a predetermined amount of time if an actual temperature at the outlet of the compressor is above said predetermined threshold.

14. The computer readable medium embodying the computer program product as in claim 11, wherein said program is further configured to regulate a geometry of a turbine housing for a predetermined amount of time if an actual temperature at the outlet of the compressor is above a predetermined temperature.

15. The non-transitory computer readable medium embodying the computer program product as in claim 10, wherein said program is further adapted to allow an overboost during an acceleration.

\* \* \* \* \*